US012629849B2

(12) United States Patent　　　　　(10) Patent No.: US 12,629,849 B2
Beaulieu et al.　　　　　　　　　　　(45) Date of Patent: May 19, 2026

(54) INVERSE TENDON ACTUATED FINGERS FOR ACTIVE GRASPING

(71) Applicant: Toyota Research Institute, Inc., Los Altos, CA (US)

(72) Inventors: Andrew M. Beaulieu, Somerville, MA (US); Alexander Alspach, Somerville, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 1050 days.

(21) Appl. No.: 17/723,916

(22) Filed: Apr. 19, 2022

(65) Prior Publication Data

US 2023/0330869 A1　　Oct. 19, 2023

(51) Int. Cl.
　B25J 15/12　　(2006.01)
　B25J 9/10　　(2006.01)

(52) U.S. Cl.
　CPC ............. B25J 15/12 (2013.01); B25J 9/104 (2013.01)

(58) Field of Classification Search
　CPC ......... B25J 15/12; B25J 15/0233; B25J 9/104
　See application file for complete search history.

(56) References Cited

U.S. PATENT DOCUMENTS

| | | | |
|---|---|---|---|
| 8,412,376 B2 | 4/2013 | Abdallah et al. | |
| 9,533,419 B1* | 1/2017 | Strauss | B25J 15/0009 |
| 9,604,791 B2 | 3/2017 | Fahldieck | |
| 9,914,214 B1* | 3/2018 | Strauss | B25J 15/0206 |
| 10,864,641 B2 | 12/2020 | Leidenfrost | |
| 2015/0032152 A1* | 1/2015 | Frings | A61B 17/29 606/207 |
| 2017/0320216 A1* | 11/2017 | Strauss | B25J 15/0028 |
| 2021/0101292 A1* | 4/2021 | Kuppuswamy | B25J 13/082 |
| 2021/0260758 A1 | 8/2021 | Singh et al. | |
| 2021/0362353 A1* | 11/2021 | Dürr | B25J 15/12 |

FOREIGN PATENT DOCUMENTS

| | | |
|---|---|---|
| CN | 105798943 B | 2/2018 |
| CN | 107671878 B | 11/2020 |

OTHER PUBLICATIONS

Adaptive gripper based on FESTO FinGripper fingers (https://www.youtube.com/watch?v=90cXfaFM408), Aug. 29, 2011.
Fin Ray Effect: gripper automatically wraps around object without additional actuation.( https://www.researchgate.net/figure/Fin-Ray-Effect-gripper-automatically-wraps-around-object-without-additional-actuation_fig8_266677295), Oct. 9, 2021.

* cited by examiner

*Primary Examiner* — Stephen A Vu

(74) *Attorney, Agent, or Firm* — Dinsmore & Shohl LLP

(57) ABSTRACT

A robotic system for grasping an object including a set of movable robotic fingers that may be in the form of a fin gripper or other moldable robotic finger similarly formed. The robotic fingers include a mechanism that is embedded in one or both of the fingers that allows the fingers to more firmly grasp an object. Further, an actuator may move the mechanism to further grip an object and perform an action on the object.

19 Claims, 4 Drawing Sheets

INVERSE TENDON ACTUATED FINGERS FOR ACTIVE GRASPING

TECHNICAL FIELD

The embodiments described herein generally relate to robotic device systems for gripping objects with a robotic gripping device. Embodiments may include two robotically operated fingers that move together to grasp an object and can include inverse tendon actuated fingers for active grasping.

BACKGROUND

Robotic devices for assisting users have been developed over the years. These robotic devices can be used for a variety of applications including manufacturing new materials, transporting objects, assembling and processing new technology, among other functions. These devices have become more complicated over the years and can perform using artificial intelligence and other advanced algorithms. Various robotic gripping devices have been developed over the years where the configuration, including a force applied to the object, is determined based on the type of object the robotic device is grasping.

Robots are commonly equipped with end effectors that are configured to perform certain tasks. For example, an end effector of a robotic arm may be configured as a human hand, or as a two-fingered gripper. However, robots do not have varying levels of touch sensitivity as do humans. End effectors may include sensors such as pressure sensors, but such sensors provide limited information about the object that is in contact with the end effector. Thus, the robot may damage a target object by using too much force, or drop the object because it does not properly grasp the object.

Further, in some applications, a deformable and compliant end effector may be desirable. For example, a deformable end effector may be desirable in robot-human interactions. Further, a deformable/compliant end effector may be desirable when the robot manipulates fragile objects. Further still, based upon objects encountered and changing conditions within an environment, it may be desirable to have deformable fingers that can have real-time modification of their stiffness (or force-displacement, used interchangeably herein).

For instance, there can be at the end of a robotic arm two fingers that can open and close, enabling the robot to pick up an object. Usually the fingers are made from materials that are fashioned from harder materials, depending on the type of application. However, these devices tend to have problems in picking up objects because the object will slip out of the grasp of the fingers. Accordingly, a need exists for alternative methods of gripping objects whereby the object does not slip through the fingers of the gripping device and whereby the proper amount of force can be exerted on the object to grasp it in order to perform a specific task.

SUMMARY

The present application relates to robotics and more particularly to robotic systems with arms and attachments thereof including inverse tendon actuated fingers. Robots are commonly equipped with end effectors that are configured to perform certain tasks. For example, an end effector of a robotic arm may be configured as a human hand, or as a two-fingered gripper. The end effectors have various configurations, but there exists a need to have a deformable gripper.

Further, in some applications, a deformable end effector may be desirable to move various objects throughout a work space. For example, a deformable end effector may be desirable in robot-human interactions. Further, a deformable end effector may be desirable when the robot manipulates fragile objects. Further still, based upon objects encountered and changing conditions within an environment, it may be desirable to have a servo motor control the end effector in order to put a certain pressure on the object being held. (or force-displacement, used interchangeably herein). Tendon pulling mimics a human hand's ability to vary force on an object. For example, the mechanism that mimics a tendon, such as a metal spring strip, or other piece of material such as a wire or malleable metal or similar material, that can have a tension that is adjusted, may push the outer wall surface such that the inner wall may be modified to more firmly engage the fingers with the object. In addition, the mechanism allows the finger to engage with an object more firmly by pushing the outer wall of the finger and allows the finger to open and easily release an object by pulling the outer wall of the finger. The structure of the fingers of the present application allows the finger to passively comply on the surface of objects while engaging or wrapping around the object actively.

Generally, this includes a robotic system including an arm with inverse tendon actuated fingers including a mechanism that allows the finger to engage with an object more firmly by pushing the outer wall of the finger and allows the finger to open and easily release an object by pulling the outer wall of the finger. The mechanism simulates the function of a tendon so that the mechanism is embedded in the finger and pushed and pulled in order to firmly grasp an object to be moved. In some embodiments, the finger may be a fin gripper. The fin gripper can be soft and triangular with cross beams that buckle and deform or collapse in to conform around objects.

In one embodiment, there is a robotic gripping device including a robotic arm; one or more opposable inverse tendon actuated fingers configured to move toward each other to grasp an object, a mechanism that allows the fingers to engage with an object by pushing the outer wall of one of the fingers so that the fingers engage with the object and pulls the outer wall of one of the fingers to release the object. The finger can include an inner wall and an outer wall. The outer wall can be a flexible wall with a mechanism embedded.

In another embodiment, there is an apparatus including a robotic arm, one or more opposable inverse tendon actuated fingers connected to the robotic arm and configured to move toward each other to grasp an object, where each inverse tendon actuated finger includes an inner surface, an outer surface, a set of cross beams that connect the inner surface with the outer surface, and a mechanism embedded in the outer surface that when pushed engages with an object by pushing the outer wall of one of the fingers with a mechanism and that pulls the outer wall of one of the fingers to release the object. Systems and methods for the present disclosure can include that a mechanism may push or pull the outer wall of the finger such that the shapes of the outer wall and the inner wall are modified. The mechanism allows for traditional tendon pulling, but also provides a more forceful "push" to engage the finger with an object.

In another embodiment, there is provided a robotic gripping system including a robotic gripping device with one or more opposable inverse tendon actuated fingers configured to move toward each other to grasp an object, a mechanism that allows the fingers to engage with an object by pushing the outer wall of one of the fingers so that the fingers engage with the object and pulls the outer wall of one of the fingers to release the object, a control system configured to control the robotic gripping device, wherein the control system comprises: one or more processors, a non-transitory computer-readable memory, and program instructions stored on the non-transitory computer-readable memory and executable by the one or more processors to control the robotic gripping device. In some embodiments, an actuator may push or pull the mechanism when needed. In some embodiments, when the hand consisting of fingers wishes to release an object that it is currently holding, the mechanism may pull the outer wall such that the front part of the finger opens and reduces a grasping force.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
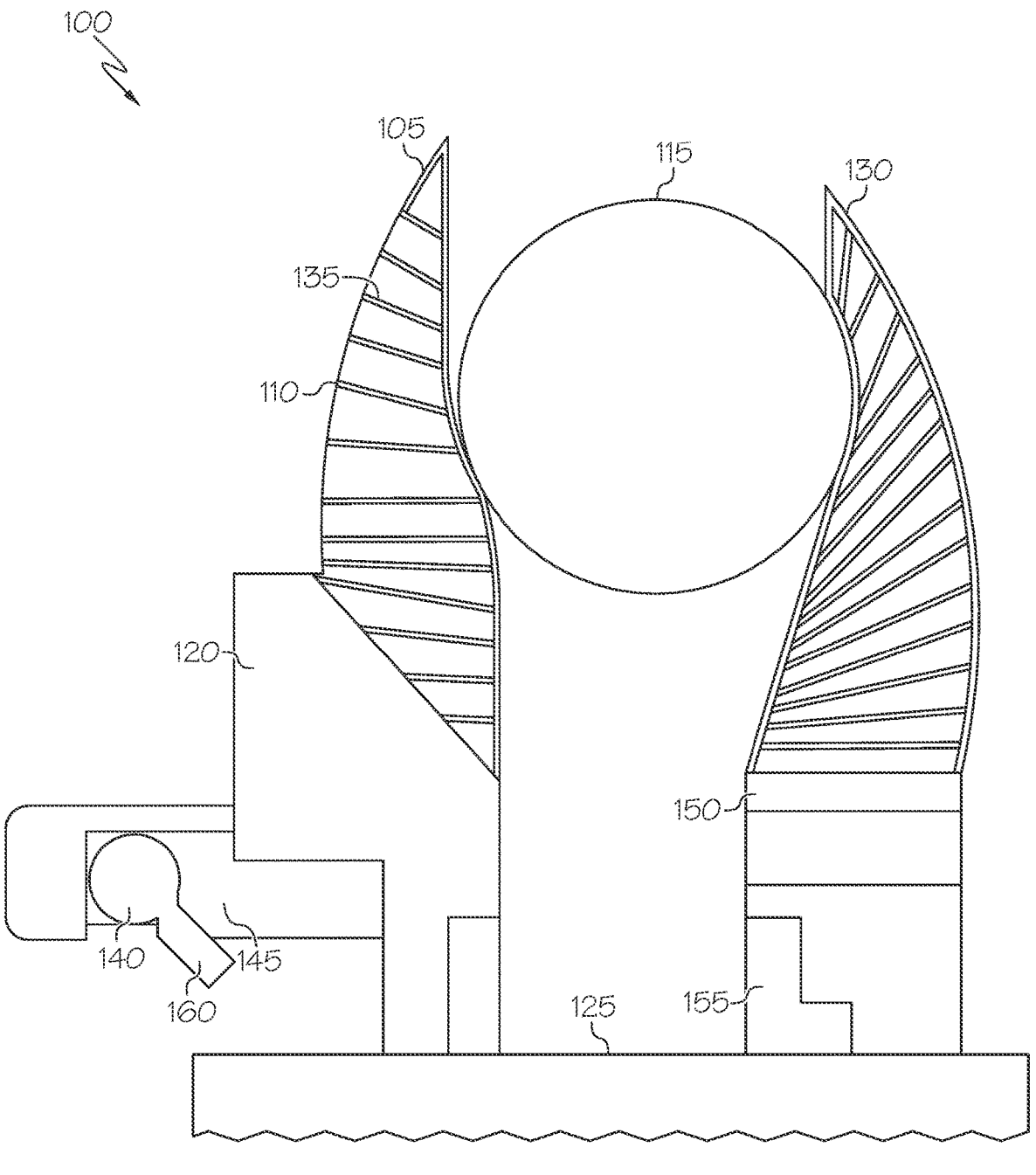
FIG. 1 depicts a non-limiting example of a robotic device system for exerting force on an object according to one or more embodiments described and illustrated herein.

Currently, robotic devices interact with objects in a variety of ways including, pushing, pulling, and grasping among other ways of interaction. A robotic device may include a robotic gripper to grasp an object and this gripper can have one or more fingers that can be moved in order to grasp an object. These fingers can be controlled by various mechanisms for ease of use and efficiency in grasping an object.

Robotic devices with arms are commonly equipped with end effectors that are configured to perform certain tasks. For example, an end effector of a robotic arm may be configured as a human hand, or as a two-fingered gripper. However, robots do not have varying levels of conformability such as the human skin and muscles as do humans. End effectors may use different materials to further help shape the effectors to grasp the object in a include sensors such as pressure sensors, but such sensors provide limited information about the object that is in contact with the end effector. Thus, the robot may damage a target object by using too much force, or by having an end effector that is too hard or the robot may drop the object because it does not properly grasp the object.

Further, in some applications, a deformable end effector may be desirable in order to grasp an object with an unusual shape. For example, a deformable end effector may be desirable in robot-human interactions to help grasp an object with sufficient force to move the object. Further, a deformable/compliant end effector may be desirable when the robot manipulates fragile objects. Embodiments of the present disclosure can include a robotic finger or a set of fingers that are connected and that make up a pair of fingers in order to grasp an object. The first or both members may be a fin gripper. Further, a robotic device may include two fingers that are controlled by the movement of a mechanism that acts as an inverse tendon within one or both of the fingers to grasp an object for various uses including movement and placement. The gripping action of the present disclosure is meant to grasp an object so as not to crush the object or to deform the object but to gently and quickly place the object in the correct location, such as in a warehouse setting.

The embodiments described herein address and overcome the deficiencies of a robotic device with fingers that are merely smooth and seek to grasp an object with no tension applied outside of the force of the two fingers pressing against the object. In one embodiment, the fingers are connected to a pivot joint, which can be connected to a servo motor to retract a spring wire, or similar mechanism within one of the fingers. In addition there may be multiple servo motors and mechanisms such as spring wires in both fingers to further help grasp the object. The robotic device may be implemented in various forms, such as a robotic arm, industrial robot, or some other arrangement. Furthermore, the robotic device may also be referred to as a robot, robotic system, or mobile robot, among other designations. In addition, the robotic device can be controlled by a servo motor or a computer with a processor using general or special purpose hardware and that executes computer instructions stored in data storage on a computer readable medium.

The processor can also control various sensors on the robotic device and other parts of the control process. There can also be included a power source and other mechanical and electrical components in order to carry out the purpose of the robotic device, including a processor. The processor can be part of a control system to control the operation of the robotic device and can communicate through wired or wireless means the instructions to the robotic device. The inverse tendon actuated fingers may include a mechanism that allows the fingers to engage with an object more firmly. This is accomplished by a mechanism that pushes the outer wall of one of the fingers allowing the finger to open and easily release the object by pulling the outer wall of the finger with the mechanism.

In certain embodiments, the fin gripper may be soft and triangular with crossbeams that are made of a harder material than the gripper surface and that buckle and conform around the object. However the fin grippers can also be other shapes, depending on the application of the device. The finger can contain an inner wall and an outer wall that are both flexible. There may be multiple fingers used to pick up objects and the fingers can be adjacent along one direction and then can also be facing one another in an opposite direction. In addition, there can be a mechanism such as a mechanism embedded in the outer wall of the finger that changes the shape of the finger based off its tension. The mechanism may push or pull the outer wall such that the shapes of the outer and inner wall are modified to grasp the object. The mechanism allows for a more forceful push to engage with the object. The surface of the finger may passively interact with the object and also actively wrap around the object. In certain embodiments there may be an actuator that pushes or pulls the mechanism as needed.

Further, in embodiments, when the user wants to release an object, the mechanism may pull the outer wall such that the front part of the finger opens and reduces a grasping force.

In some embodiments there may be a living hinge that when rotated allows the finger to more fully grasp the object. The living hinge may be formed of a flexible material to allow the plurality of lateral fingers to pivot and move relative to the central finger. The living hinge may maintain the first set of fingers in an initial position, and bias the first set of fingers from a gripped position toward the initial position. In the initial position, the contact surface of the contact portion of each of the central finger and the plurality of lateral fingers may be coplanar. In the gripped position, the central finger may be displaced in the longitudinal direction along the central slot. In the gripped position, the plurality of lateral fingers are pivoted away from the initial position such that the contact surfaces of the central finger and the plurality of lateral fingers are concave. Further, there can be two robotic arms with multiple fingers as described herein and the gripping arms can move relative to one another in order to pick up and move an object safely and securely.

It should be understood that in the robot system, there is a gripper that is used to pick up objects that have various shapes and sizes and materials in order to implement automation of logistics. The gripper can be made of a plurality of fingers that are created of a rubber or similar material that has a thickness that varies with the variety of uses. Specific shapes and structures described herein can be changed and implemented from one embodiment to another without departing from the scope and spirit of the present disclosure and the arrangement of each component can also be changed in order to accomplish the various goals and objectives that are described herein.

Referring now to the drawings, FIG. 1 generally depicts a first embodiment of the robotic gripping device for grabbing an object within a variety of settings. In particular FIG. 1 shows a robotic device system 100 for grasping an object 115. The object 115 can be of various shapes but in the current figure, it is shown as a can and in a cylindrical shape. The robotic gripping device 100 generally comprises a first set of fingers, a second set of fingers disposed opposite the first set of fingers, and a base for each set of fingers. In FIG. 1 each seat only contains one finger, but other configurations including multiple fingers in a set are also contemplated. The robotic device 100 may act autonomously or by control of a user. The fingers are generally coupled to a base such that the fingers can move in an arcing direction with movement in the horizontal and vertical planes. The example configuration shown is not limited to such a configuration but is one example that may be used in connection with the implementations described herein. Various embodiments of the robotic gripping member and the operation of the robotic gripping member will be described in more detail herein. Characteristics of the material that is used to compose the fingers can vary and can include such as natural rubber or silicone, or similarly adaptable materials that conform around an object. In one embodiment, the user can set a force such that the force at the end of the finger is modeled as the force from the pivot due to the actuator or simply the movement of the finger minus some frictional losses of the finger interacting with the object.

In one embodiment, there are two sets of fingers that wrap around the object. Specifically, in FIG. 1 and in this instance there is only one finger 105, 130 in each set, that can be pushed upward and toward each other to grasp the object 115. There may be a robotic arm (not shown) that is connected to the fingers 105, 130, depending on the application. Before the robot grips any object, the robot arm is positioned adjacent to the object. This can be accomplished movement of the arm that the gripper is attached to through various electromechanical mechanisms. In addition, there are movable cross beams 135 (i.e., "ribs") on finger 105 that can similarly be on finger 130. These cross beams 135 can be of a harder material than either the outer or inner walls of the fingers 105, 130. There is also a mechanism 110 embedded in finger 105 that curves along the outer wall of the finger 105 and that which can be connected to a pivot joint 120 and sit on a base 125. The mechanism 110 can take the form of a metal steel strip, but other material can also be used.

Pivot joint 120 can be a "living hinge" that when rotated interlocks with a member connected to the fingers and allows the finger to more fully grasp the object. The living hinge may be formed of a flexible material to allow the plurality of lateral fingers to pivot and move relative to the central finger. The living hinge may maintain the first set of fingers in an initial position, and bias the first set of fingers from a gripped position toward the initial position. In the initial position, the contact surface of the contact portion of each of the central finger and the plurality of lateral fingers may be coplanar. In the gripped position, the central finger may be displaced in the longitudinal direction along the central slot. In the gripped position, the plurality of lateral fingers are pivoted away from the initial position such that the contact surfaces of the central finger and the plurality of lateral fingers are concave.

In the embodiment shown in FIG. 1 there is also a lever 160 that is connected to the pivot joint 120 through a rotatable member 145 that may be pulled via a lever 160 to further tighten or extend the mechanism 110 to grasp the object and as this hinge 140 rotates by pushing or pulling lever 160 it moves the rotatable member 145 to further tighten the mechanism 110. The finger 130 opposite of finger 105 can be a stationary or mobile finger 130, and as shown it is stationary and attached to base 125. However, a similar movement structure including a pivot joint, a rotatable member and a hinge may be used to form a similar movement structure in order to further grasp the object in concert with the finger 105. Further, the fingers can be actuated by a smart pivot or smart hinge comprised of hinge 140, rotatable member 145 and lever 160 that is controlled through various springs within the hinge 140 and a lever 160 that actuates the hinge 140 that are set at different tensions in order to grasp the object. The apparatus can be operated via a servomotor and computer system as further detailed below as well.

The fingers 105, 130 can be made of a pliable material in order to grasp the object more firmly. For instance, the fingers can be made of a thermoplastic polyurethanes (TPU) in order to have elasticity and resistance to oil, grease or other substances that may be on the object trying to be grasped. The structures can also be made of thermoplastic elastomer (TPE) materials, which exhibits the characteristics of rubber. Such examples should not limit the materials that the structures can consist, and further water-cutting methods can form different shapes of the structures. When the fingers 105, 130 come into contact with the shape of the object, and the material comes into contact with the object 115, the fingers 105, 130 conform to the object so as not to squeeze and deform the object. It should be understood that object 115 is in the shape of a can, but other objects with various shapes are also included and require various shapes of end effectors along with an outer surface of the effector that is controlled by a mechanism, similarly as disclosed in FIG. 1.

In addition, there may be a control system with a processor that executes instructions to operate the robotic device system 100 stored on a computer readable medium. The control system can include a power source for both the robotic device system 100 and the various components in the control system and can include sensors to detect feedback and movement of the robotic device. The computer readable medium can store data and instructions related to the movement of the robotic device system 100 and can set the amount of pressure that the fingers 105, 130 apply to the object 115. Further, the sensors can detect the amount of pressure applied to the object and a feedback can be provided to the robotic device system 100 to adjust the amount of force applied.

Further, as the spring steel mechanism 110 is moved, the finger 105, which can take the form of a fin gripper, is moved to further grasp the object 115. In certain embodiments, the fin gripper may be soft and triangular with cross beams that buckle and conform around the object. However the fin grippers can also be other shapes, depending on the application of the device. The finger 105 can contain an inner wall and an outer wall that are both flexible. In addition, there can be a spring steel mechanism 110 embedded in the outer wall of the finger 105 that changes the shape of the finger 105 based off its tension. The spring steel mechanism 110 may push or pull the outer wall such that the shapes of the outer and inner wall are modified to grasp the object. The mechanism 110 allows for a more forceful push to engage with the object. The surface of the finger 105 may passively interact with the object 115 and also actively wrap around the object 115. In embodiments there may be an actuator that push or pulls the mechanism 110 as needed. Further, in embodiments, when the user wants to release an object, the mechanism 110 may pull the outer wall such that the front part of the finger 105 opens and reduces a grasping force.

It should be understood that the fingers 105, 130 can be of various shapes and sizes depending on the application and can pick up objects of various shapes and sizes. As the inner wall engages with the object 115 it exerts a force first on the portion of the object 115 closest to the base 125 and then the force is continually increased as the finger 105 presses the object 115 against the other finger 130 so that the object 115 is not dropped. The fingers 105 and 130 are stationary as shown, but can be connected to a robotic arm and moved in a vertical or horizontal direction depending on the application. In addition the whole robotic system can move the robot gripper device 100 in a diagonal direction or any other direction in order to position itself over an object to be moved into a new position. In addition the area of contact with the object 115, 130 may be increased to further increase adhesion and pressure on the object so that the object can be grasped more firmly for movement and other purposes.

As shown in finger 130, the cross-bars 135 can be very sturdy so as to provide a solid backing for the inner wall of finger 130 to hold the object 115. The outer wall is also supple and can bend with the shape of the object 115. Further, finger 130 can be held to the base of the system 125 in a variety of ways, and in a particular embodiment shown in FIG. 1, there is a based member 155 that is connected to the base 125 and that base member 155 is also connected to a holding member 150, that is coupled to the finger 130 in order to hold the finger in place and pick up the object. This embodiment should not limit the ability for other holding configurations to make sure the object is grasped firmly and the object is moved correctly to the proper position. The holding member 150 and the base member 155 can both be made of any readily available materials including plastic and rubber and generally are less pliable than the materials that are used for the cross beams and the inner and outer walls of the finger 130.

Figure 2:
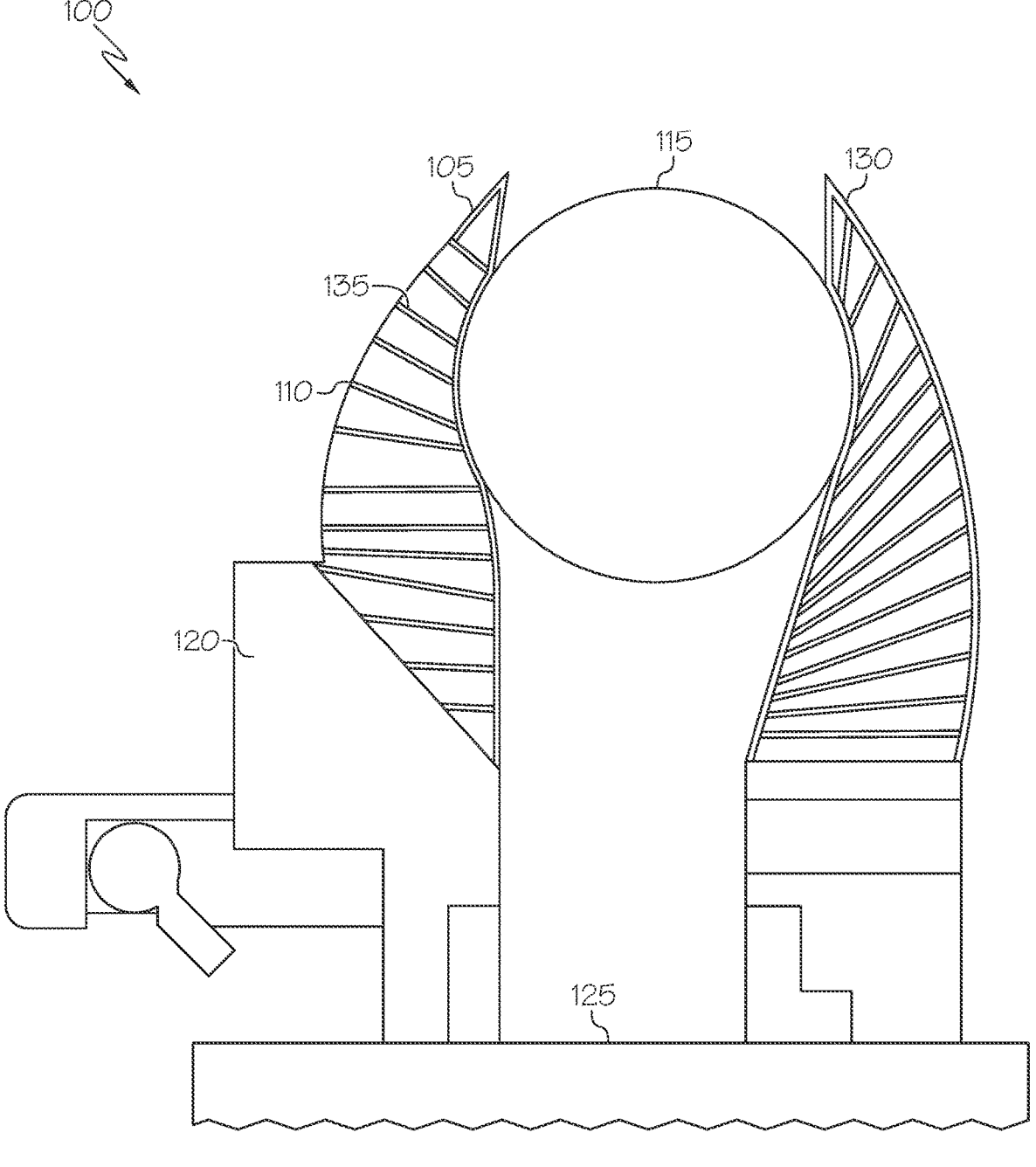
FIG. 2 depicts an embodiment including one inverse tendon actuated fingers for grasping objects in a robotic system according to one or more embodiments described and illustrated herein.

FIG. 2 shows an example embodiment of the device with one of the fingers 105 in the robotic device system 100. There are movable cross beams 135 on finger 105 that can similarly be on finger 130. Further this is a base 125 that holds the fingers 105, 130 in place depending on the usage of the finger. There is a mechanism 110 that is embedded inside the finger 105 and can be used to wrap the finger 105 around an object 115. The object is not limited to a round shape and can be any shape that one of ordinary skill in the art would consider to pick up with a robotic gripping device. There can be a based 125 which can be stationary or movable and may controlled by a control system. When the robotic device system 100 uses the fingers 105, 130 to grasp an object 215 the fingers 205, 230 can deform to grasp the object. In the current embodiments the fingers 105 and 130 are wrapped around the object 115.

In the current embodiment, the user wishes to grasp an object 115, so the mechanism 110, which is embedded in the outer wall of the finger 105 is pushed, either by an actuator or the user, so that the finger 105 is wrapped around the object 115. The other finger 130 presses against the object 115 and thus the object 115 is more firmly grasped for movement or other operations on the object 115.

Figure 3:
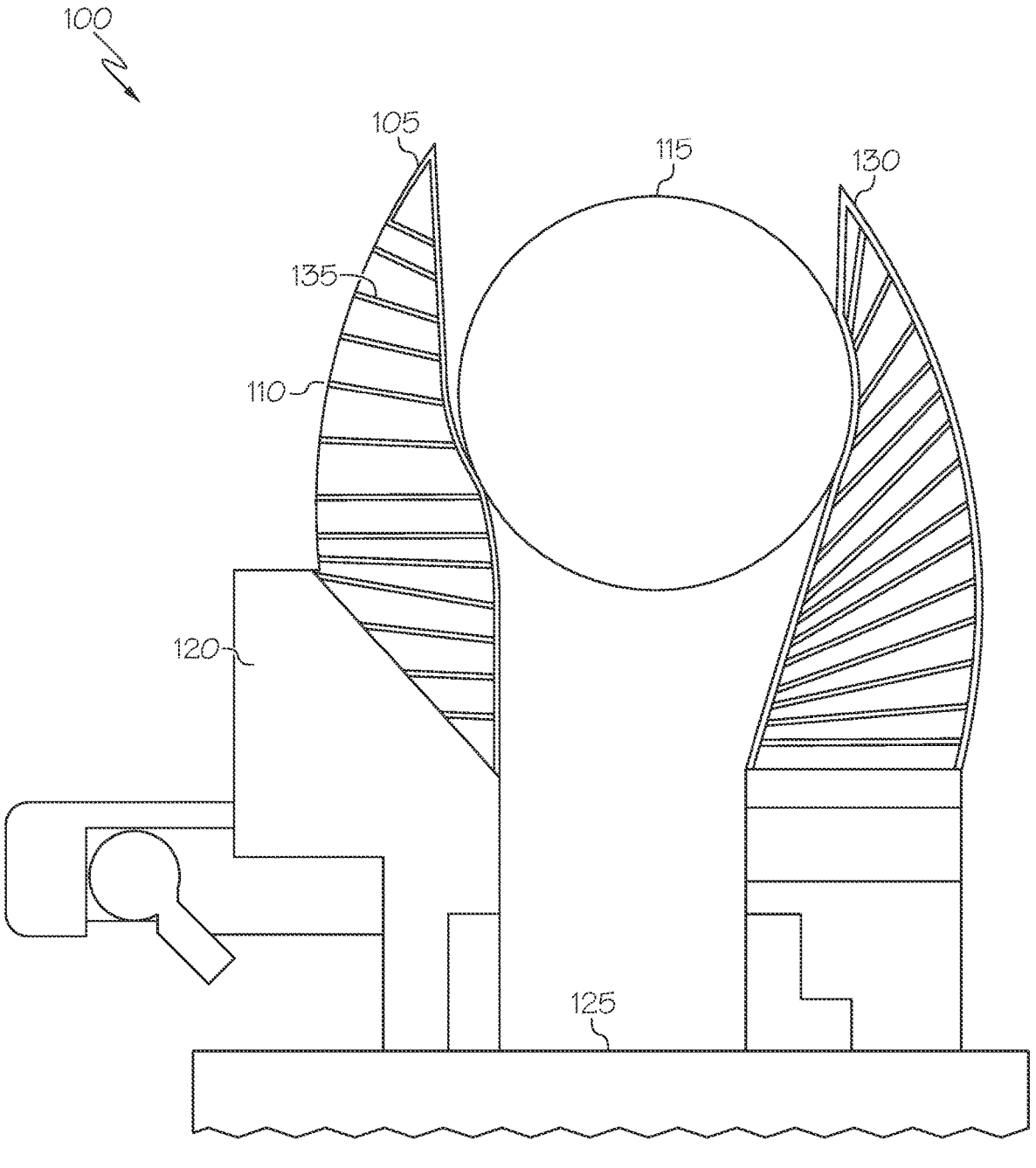
FIG. 3 depicts a second embodiment of an inverse tendon actuated finger for grasping objects in a robotic system according to one or more embodiments described and illustrated herein.

FIG. 3 shows another embodiment of the robotic system 100 with fingers 105, 130 that wrap around object 115, whereby the fingers 105 and 130 un-grasp the object 115. There are movable spines or cross beams 135 on finger 105 that can similarly be on finger 130. The material is a plastic, or something similar, of both fingers 105, 130 and allows the material to form to the shape of the object. In addition there is a mechanism 110 within the finger 105, that can be moved. As the mechanism 110 is pushed the outer wall of the finger 110 disengaged with the object 115. More or less fingers can be used and this example embodiment should not be construed to limit the amount or movement of the fingers. They are shown to make a pincer movement, but other movements can be considered, such as sliding and rotating. It should be understood that other configurations of the fingers 105, 130 and the mechanism 110 can be envisioned.

Figure 4:
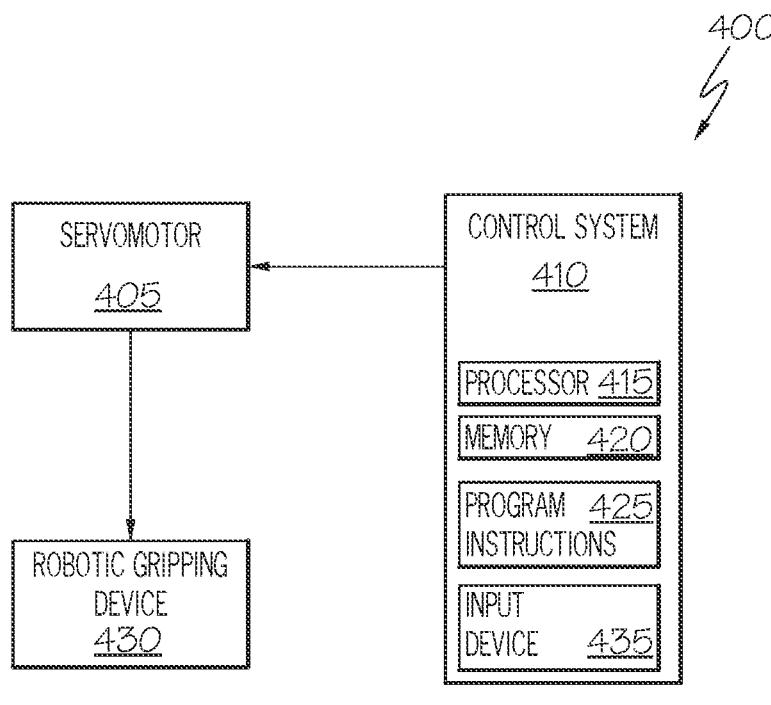
FIG. 4 depicts a control system for two inverse tendon actuated fingers for grasping objects in a robotic system.

FIG. 4 shows an example embodiment of a system 400 that controls the mechanism 110 of the previous figures and thus controls the fingers 105, 130 within the robotic device. There is included in the system 400 a servomotor 405, a control system 410, with processor 415, memory 420, program instructions 425, an input device 435 and a robotic gripping device 430 that contains any one of the examples of FIG. 1-3. The robotic gripping device 430 can have various configurations. For instance, the robotic gripping device 430 can have one or more fingers 105, 130 that grasp object 115 based on commands from a user input through the input device 435. Processor 415 may include one or more processing units, such as, without limitation, a multi-core configuration. In one embodiment, processor 415 includes a field programmable gate array (FPGA).

In embodiments, processor 415 may include any type of processor that enables control system 410 to function as described herein. In some embodiments, executable instructions are stored in memory device 420. Control system 410 is configurable to perform one or more executable instructions 425 described herein by programming processor 415. For example, processor 415 may be programmed by encoding an operation as one or more executable instructions and providing the executable instructions in memory device 420. In one embodiment, memory device 420 is one or more devices that enable storage and retrieval of information such as, without limitation, executable instructions or other data. Memory device 420 may include one or more tangible, non-transitory, computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory.

The above memory types are exemplary only, and are thus not limiting as to the types of memory usable for storage of a computer program. As schematically depicted in FIG. 4, the communication path communicatively couples the processor and the non-transitory electronic memory of the controller with a plurality of other components of the control system. For example, the control system depicted in FIG. 4 includes the processor and the non-transitory electronic memory communicatively coupled with the operating device, the sensors, and the actuator.

The instructions can be in any form available in current control system technology and move the various parts of the robotic gripping device 430 in order to position the fingers to grasp the object. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 420. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

In addition, the processor 415 may be any device capable of executing machine-readable instructions. For example, the processor 415 may be an integrated circuit, a microchip, a computer, or any other computing device. The non-transitory electronic memory and the processor are coupled to the communication path that provides signal interconnectivity between various components and/or modules of the actuation system. Accordingly, the communication path may communicatively couple any number of processors with one another, and allow the modules coupled to the communication path to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Servo motor or actuator 405 may be controlled by control system 410 in order to grasp an object 115 with the various finger configurations 105, 130. The servomotor can also be replaced by other motors, including hydraulic motors with hydraulic cylinders and should not be limited to any particular servomotor. The user can also enter into the control system 410 via input device 435 a desired pressure to grasp an object 115 with the fingers 105, 130. Nothing should be seen as limiting various embodiments of this disclosure to further grasp an object 115 and allow the fingers 105, 130 to move freely and consistent with a user's intentions.

In addition, a user can set a desired set of force control parameters for the fingers 105, 130 in order to grasp a particular object with a set force. For force control of a given finger with a mechanism such as a steel wire acting like a tendon, there can be a desired torque amount that is set so that the servo motor 405 applies a particular force to the mechanism, which translates into torque, allowing the finger to grasp the object with a certain force. The two fingers 105, 130 may have two gripping arms that can pivot relative to one another and can have an open and a closed position releasing the object. It should be understood that the base 125 can be coupled to a table or other firm surface for experimental grasping, or the finger 105, 130 can be coupled a the arm of a robot for grasping objects in a variety of environments.

The devices may be connected via a network, and the network may include any wired or wireless networking hardware, such as a modem, Local Area Network (LAN) port, wireless fidelity (Wi-Fi) card, WiMax card, mobile communications hardware, and/or other hardware for communicating with other networks and/or devices, of FIG. 4. The Control System 410 is communicatively coupled to the servo motor 405, which is in turn communicatively coupled to the robotic gripping device 430. The width of the cup or the object 315 may be measured by an image scanning of an image sensor unit (not shown), and a processor 415 may control a gap between the first finger and the second finger according to the measured width. There are other potential image analysis applications that this system 400 can undertake that include multiple fingers applying different pressures to the object 315, depending on the application and the desired outcome for the user.

The memory 420 may be one or more types of hardware memory. For example, the memory 420 may include or take the form of one or more computer-readable storage media that can be read or accessed by processor(s) 415. The one or more computer-readable storage media can include volatile and/or non-volatile storage components, such as optical, magnetic, organic, or another type of memory or storage, which can be integrated in whole or in part with processor(s) 415. In some implementations, the memory 420 can be a single physical device. In other implementations, the memory 420 can be implemented using two or more physical devices, which may communicate with one another via wired or wireless communication. As noted previously, the memory 420 may include the program instructions 525 and various types of data. The data may be any type of data, such as configuration data, sensor data, and/or diagnostic data, among other possibilities.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive. It should now be understood that embodiments of the present disclosure are directed to a robotic grasping member such as a fin gripper than can be controlled by a user.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A robotic gripping device comprising:
a robotic arm;
one or more opposable inverse tendon actuated fingers, comprising:
an inner wall;
an outer wall;
a mechanism embedded in the outer wall; and
a base;
wherein:
the one or more opposable fingers are configured to move toward each other to grasp an object; and
a movement of the mechanism allows the one or more opposable fingers to engage with an object by pushing the outer wall of one of the one or more opposable fingers so that the one or more opposable fingers engage with the object and pulls an outer wall of one of the one or more opposable fingers to release the object.

2. The robotic gripping device as described in claim 1, wherein the one or more opposable fingers includes a fin gripper.

3. The robotic gripping device as described in claim 2, wherein the fin gripper is composed of soft materials and is triangular with cross beams that buckle and deform or collapse around the object.

4. The robotic gripping device as described in claim 1, wherein the mechanism is a metal spring strip.

5. The robotic gripping device as described in claim 1, wherein there is an actuator that pushes or pulls the mechanism.

6. The robotic gripping device as described in claim 1, wherein a design of the fingers allows them to passively engage with the object before actively engaging using the mechanism.

7. The robotic gripping device as described in claim 1, wherein an object is released by pulling the outer wall of the one or more opposable fingers.

8. An apparatus comprising:
a robotic arm;
one or more opposable inverse tendon actuated fingers connected to the robotic arm and configured to move toward each other to grasp an object, wherein each inverse tendon actuated finger comprises:
an inner wall;
an outer wall;
a set of cross beams that connect the inner surface with the outer surface; and
a mechanism embedded in the outer surface that when pushed engages with an object by pushing the outer wall of one of the one or more opposable fingers with a mechanism and that pulls the outer wall of one of the one or more opposable fingers to release the object.

9. The apparatus as described in claim 8, wherein the one or more opposable fingers includes a fin gripper.

10. The apparatus as described in claim 9, wherein the fin gripper is composed of soft materials and is triangular with cross beams that buckle and deform or collapse around the object.

11. The apparatus as described in claim 8, wherein the mechanism is controlled by a user providing a set tension.

12. The apparatus as described in claim 8, wherein there is an actuator that pushes or pulls the mechanism.

13. The apparatus as described in claim 8, wherein a design of the fingers allows them to passively engage with the object before actively engaging using the mechanism.

14. A robotic gripping system comprising:
a robotic arm;
one or more opposable inverse tendon actuated fingers connected to the robotic arm and configured to move toward each other to grasp an object, wherein each inverse tendon actuated finger comprises:
an inner wall;
an outer wall;
a set of cross beams that connect the inner surface with the outer surface; and
a mechanism embedded in the outer surface that when pushed engages with an object by pushing the outer wall of one of the one or more opposable fingers with a mechanism and that pulls the outer wall of one of the one or more opposable fingers to release the object; and
a control system configured to control the robotic gripping device, wherein the control system comprises:
one or more processors;
a non-transitory computer-readable memory; and
program instructions stored on the non-transitory computer-readable memory and executable by the one or more processors to control the robotic gripping device.

15. The system as described in claim 14, wherein the one or more opposable fingers includes a fin gripper.

16. The system as described in claim 15, wherein the fin gripper is composed of soft materials and is triangular with cross beams that buckle and deform or collapse around the object.

17. The system as described in claim 14, wherein the mechanism is a metal spring strip.

18. The system as described in claim 14, wherein there is an actuator that pushes or pulls the mechanism.

19. The system as described in claim 14, wherein a design of the fingers allows them to passively engage with the object before actively engaging using the mechanism.

* * * * *